United States Patent
Chen et al.

(10) Patent No.: US 9,635,169 B2
(45) Date of Patent: Apr. 25, 2017

(54) METHOD FOR MANAGING DATA TRAFFIC OF SOFTWARE AND PORTABLE ELECTRONIC APPARATUS USING THE SAME

(71) Applicant: Wistron Corporation, New Taipei (TW)

(72) Inventors: Ling Chen, New Taipei (TW); Wei-Wei Liu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 25 days.

(21) Appl. No.: 14/611,358

(22) Filed: Feb. 2, 2015

(65) Prior Publication Data

US 2016/0044157 A1 Feb. 11, 2016

(30) Foreign Application Priority Data

Aug. 7, 2014 (CN) .......................... 2014 1 0386864

(51) Int. Cl.
*H04M 1/725* (2006.01)
*H04W 4/00* (2009.01)
*H04W 52/02* (2009.01)

(52) U.S. Cl.
CPC ....... *H04M 1/72577* (2013.01); *H04W 4/001* (2013.01); *H04W 52/0264* (2013.01); *Y02B 60/50* (2013.01)

(58) Field of Classification Search
CPC ............. H04M 1/72577; H04W 4/001; H04W 52/0264; Y04S 20/14; Y04S 20/228; Y04S 20/242; H04N 1/32448
USPC .......................................................... 455/418
See application file for complete search history.

(56) References Cited

U.S. PATENT DOCUMENTS

| | | | | |
|---|---|---|---|---|
| 2014/0143568 A1* | 5/2014 | Kim | ...................... | G06F 1/3206 713/323 |
| 2014/0173319 A1* | 6/2014 | Zeng | .................. | G06F 11/3013 713/340 |
| 2014/0362768 A1* | 12/2014 | Wood | .................... | H04L 67/322 370/328 |
| 2014/0369296 A1* | 12/2014 | Breuer | .................. | H04W 74/04 370/329 |
| 2015/0109908 A1* | 4/2015 | Andrada | ............... | H04W 12/06 370/230 |
| 2015/0208352 A1* | 7/2015 | Backholm | ......... | H04W 52/0251 455/574 |
| 2015/0223285 A1* | 8/2015 | Ljung | ............... | H04W 52/0209 370/311 |
| 2016/0099997 A1* | 4/2016 | Sen | ....................... | H04W 4/001 709/203 |
| 2016/0183193 A1* | 6/2016 | Laffaye | ............. | H04W 52/0251 370/311 |

* cited by examiner

*Primary Examiner* — Hirdepal Singh
(74) *Attorney, Agent, or Firm* — McClure, Qualey & Rodack, LLP

(57) ABSTRACT

A method for managing data traffic of software adapted for a portable electronic apparatus is provided. The method includes steps of: providing a user interface through the portable electronic apparatus; receiving a user input via the user interface; determining the user input to select at least one first application to be traffic managed from an application group; and turning off the data traffic of the at least one first application after the portable electronic apparatus enters a standby mode.

11 Claims, 6 Drawing Sheets

METHOD FOR MANAGING DATA TRAFFIC OF SOFTWARE AND PORTABLE ELECTRONIC APPARATUS USING THE SAME

This application claims the benefit of People's Republic of China application Serial No. 201410386864.1, filed Aug. 7, 2014, the subject matter of which is incorporated herein by reference.

BACKGROUND OF THE INVENTION

Field of the Invention

The invention relates in general to a method for managing data traffic and an electronic apparatus using the method, and more particularly to a method for managing data traffic of software and a portable electronic apparatus using the method.

Description of the Related Art

As communication technologies become increasingly popular and mature, most current cell phones can be linked to the Internet at all times. When a cell phone enters a standby mode, most applications in the cell phone are allowed to operate in the background and to use network resources. However, these applications operating in the background in the standby mode may result in unnecessary waste of data traffic.

Therefore, there is a need for a solution for managing data traffic of software to prevent the above unnecessary waste of data traffic.

SUMMARY OF THE INVENTION

The invention is directed to a method for managing data traffic of software and a portable electronic apparatus using the method. Thus, a user is allowed to turn off data traffic of a selected application in a standby mode to eliminate the unnecessary waste of data traffic.

According to an aspect of the present invention, a method for managing data traffic of software adapted for a portable electronic apparatus is provided. The method includes steps of: providing a user interface through the portable electronic apparatus; receiving a user input via the user interface; determining the user input to select at least one first application to be traffic managed from an application group; and turning off the data traffic of the at least one first application after the portable electronic apparatus enters a standby mode.

According to another aspect of the present invention, a portable electronic apparatus is provided. The portable electronic apparatus includes a user control module, a power management module and a communication control module. The user control module provides a user interface adapted to receive a user input, and determines the user input to select at least one first application to be traffic managed from an application group. The power management module renders the portable electronic apparatus to operate in a standby mode or a normal mode. The communication control module turns off data traffic of the at least first application after the portable electronic apparatus enters the standby mode.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
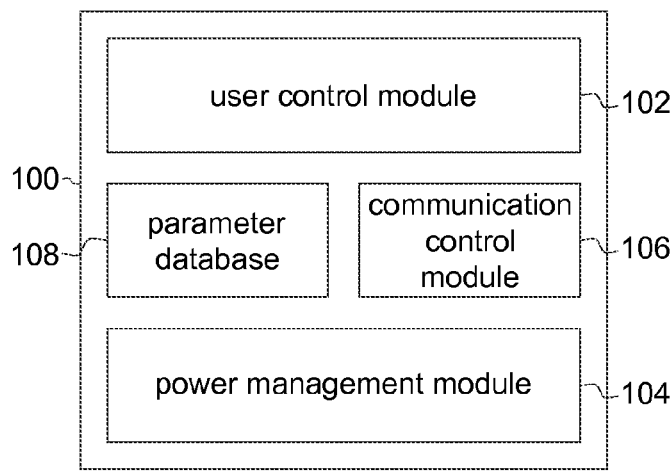
FIG. 1 is a block diagram of a portable electronic apparatus according to an embodiment of the present invention.

Several embodiments are described in detail below. It is to be understood that these embodiments are examples for explaining the disclosure, and are not to be construed as limitations to the scope of the disclosure. Further, unnecessary elements in the drawings of the embodiments are omitted to better illustrate technical features of the disclosure.

FIG. 1 shows a system block diagram of a portable electronic apparatus 100 according to an embodiment of the present invention. For example, the portable electronic apparatus 100 may be a smart phone, a personal digital assistant (PDA), a tablet computer or a laptop computer. In some applications, the portable electronic apparatus 100 may be installed with software such as multiple mobile applications (app), such as instant messaging software "QQ", "Line" and "WhatsApp", or email software such as "Email".

The portable electronic apparatus 100 includes a user control module 102, a power management module 104, and a communication control module 106. The user control module 102 provides a user interface for receiving a user input, and determines the user input to select at least one first application to be traffic managed from an application group. The user control module 102 may be implemented by a hardware circuit or a software program. For example, the user control module 102 may be installed in the portable electronic apparatus 100 in form of an app. When a user activates the app, the corresponding user interface may be displayed and operated to manage data traffic of associated software.

The power management module 104 renders the portable electronic apparatus 100 to be operable in a standby mode or a normal mode. In the standby mode, the portable electronic apparatus 100 may keep certain essential functions such as a call answering function and a network function, and turn off other functions such as a screen display function in order to achieve power saving. In the normal mode, the portable electronic apparatus 100 may activate all functions for the user to operate. Assuming that the portable electronic apparatus 100 is a smart phone, when the portable electronic apparatus 100 stays in an idle state for a predetermined period, a touch screen of the portable electronic apparatus 100 is automatically turned off and a part of the apps (e.g., instant messaging software) are kept to operate in the background. It should be understood that, the above example is for one to better understand the present invention. In some applications, the standby mode and the normal mode of the portable electronic apparatus 100 may have different designs according to different power design solutions.

After the portable electronic apparatus 100 enters the standby mode, the communication control module 106 turns off data traffic of at least one first application. In the embodiment, the communication control module 106 is in charge of a communication function of the portable electronic apparatus 100. For example, via 3G/GPRS communication standards, the communication control module 106 allows the portable electronic apparatus 100 to connect to a network for associated data transmission. As the communication control module 106 turns of the data traffic of a selected application after the portable electronic apparatus 100 enters the standby mode, not only data traffic that is inadvertently wasted (e.g., data traffic of instant messaging software "QQ", "Line" and "WhatsApp" operating in the background) can be saved, but also the user may save a considerable amount of money spent on Internet access.

In the example in FIG. 1, the portable electronic apparatus 100 may selectively include a parameter database 108. The parameter database 108 stores multiple sets of program parameters corresponding to the application group. The user control module 102, the power management module 104 and the communication control module 106 may communicate through these program parameters. Assume that the portable electronic apparatus 100 adopts an Android platform. For example, the parameter database 108 may be an embedded database platform SQlite built-in the platform. In this example, the modules of the portable electronic apparatus 100 may achieve the above traffic management mechanism through transmission of the parameters among one another. It can be understood that, in some applications, the program parameters used for communication among the modules may be stored in another memory unit. Alternatively, the modules may directly send communication messages to one another to operate in collaboration.

Figure 2:
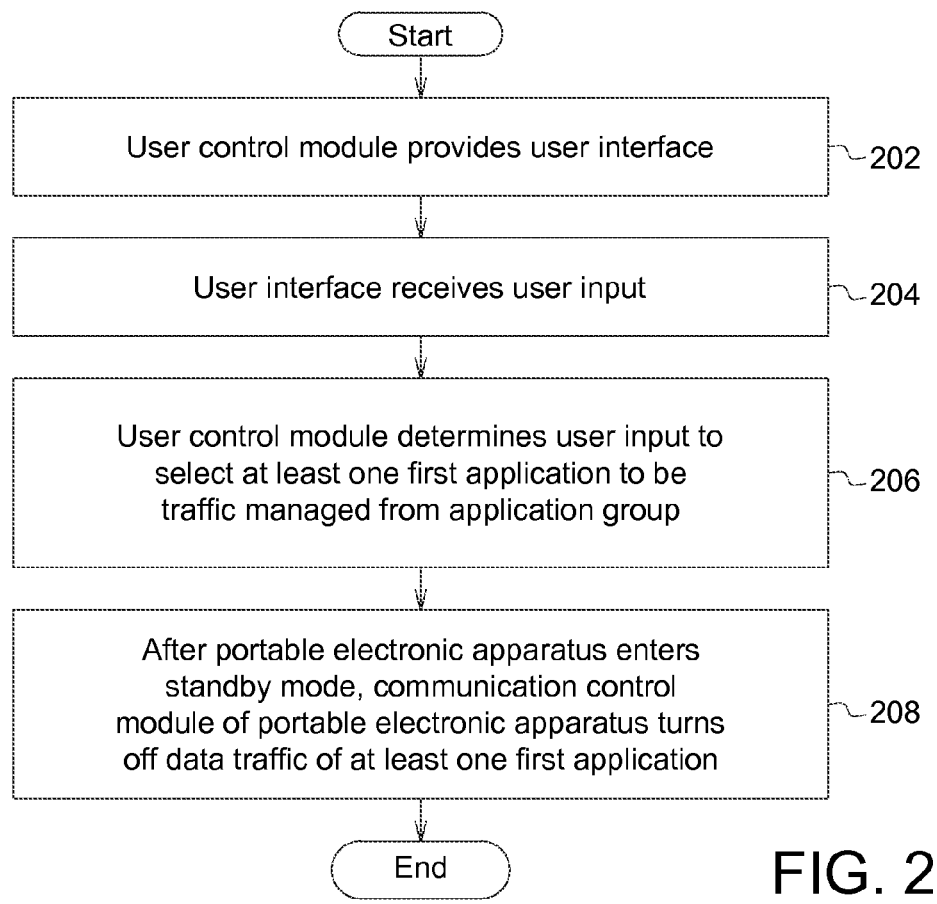
FIG. 2 is a flowchart of a method for managing data traffic of software performed by a portable electronic apparatus.

FIG. 2 shows a flowchart of a method for managing data traffic of software. The method can be performed by the portable electronic apparatus 100. Referring to FIG. 2, in step 202, the user control module 102 provides a user interface for a user to manage traffic for a specific application. For example, the user control module 102 may display the user interface by touch a screen. In some application, the user interface may be a graphics user interface including text and/or graphics. The user interface prompts a user and performs the traffic management of the application disclosed by the embodiment in response to a user input.

In step 204, the user interface receives a user input. For example, the user input is a set of a series of commands that a user performs according to operation prompts displayed on the user interface. Take a user interface displayed by a touch screen for example. When the user operates the user interface by gestures such as click selecting and sliding, associated control operations form the user input. In an example, when operations of the user interface do not involve a touch screen or operations of the user interface are performed in collaboration with physical control keys, the user may generate the user input via corresponding control operations.

In step 206, the user control module 102 determines the user input to select at least one first application to be traffic managed from an application group. For example, the application group includes multiple communication applications. These communication applications are capable of operating in the background of the portable electronic apparatus 100 and generating corresponding data traffic. As previously stated, for example, these communication applications are instant messaging software such as "QQ", "Line" and "WhatsApp", or email software such as "Gmail". In addition to the above examples, the applications in the application group of the present invention may have corresponding designs according to different application situations. Preferably, when the portable electronic apparatus 100 may select applications that continue consuming network data traffic in the standby mode as the applications included in the application group, hence allowing the user to manage data traffic of these applications.

In step 208, after the portable electronic apparatus 100 enters the standby mode, the communication control module 106 of the portable electronic apparatus 100 turns off the data traffic of the at least one first application. More specifically, after the portable electronic apparatus 100 enters the standby mode, the data traffic of the application that selected by the user to be traffic managed as determined in step 206 is turned off by the communication control module 106, e.g., a corresponding mobile data service is turned off. For the application whose data traffic is turned off, the application becomes incapable of performing data transmission with external communication networks, e.g., packet transmission via 3G/GPRS. Thus, the undesired data traffic generated by such applications when the portable electronic apparatus 100 is in a standby mode can be eliminated.

Figure 3:
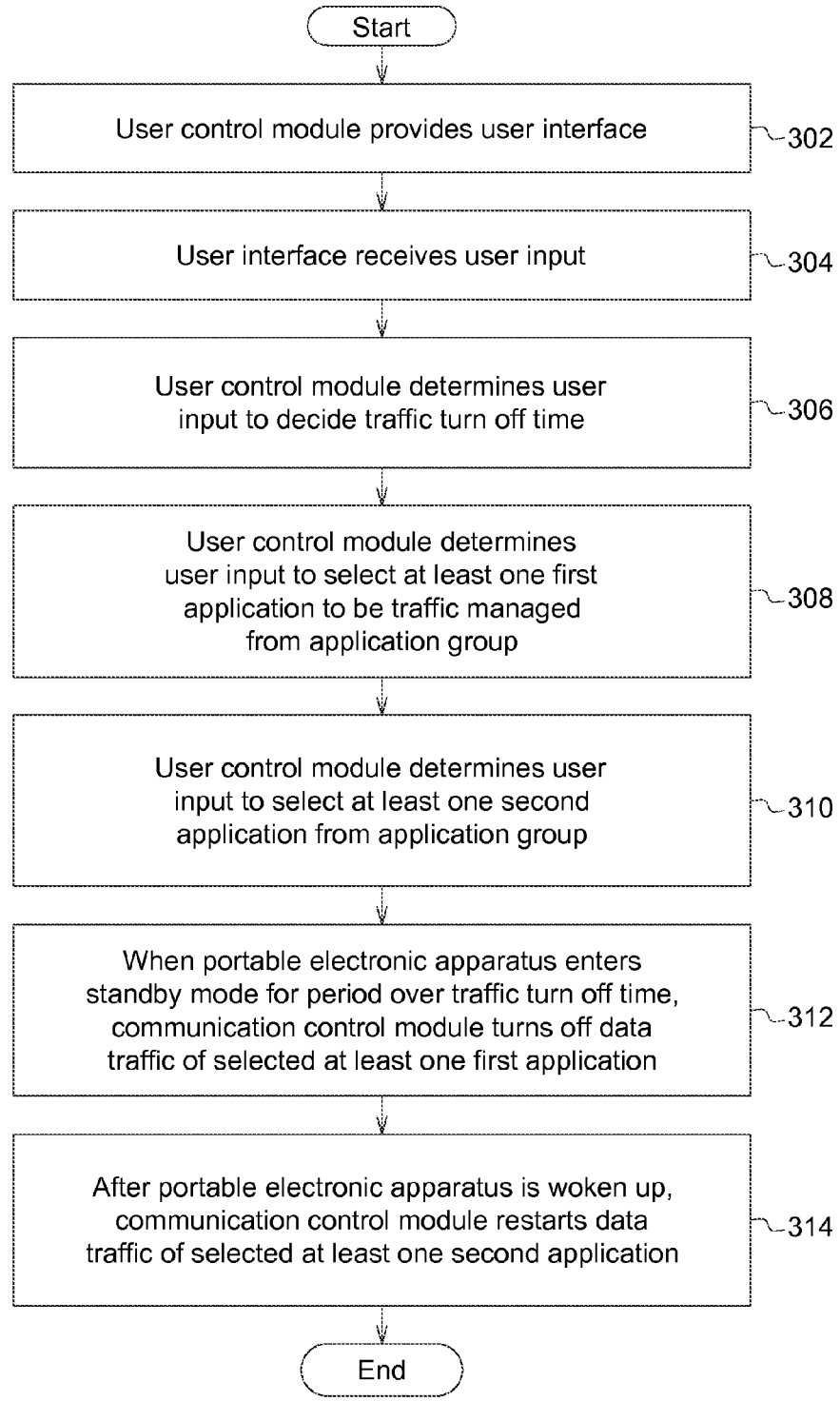
FIG. 3 is a flowchart of another example of a method for managing data traffic of software performed by a portable electronic apparatus.

The user interface provided by the user control module 102 may include settings of traffic turn off time and/or application data traffic restart. A corresponding method is shown by the exemplary flowchart in FIG. 3. FIG. 3 shows a flowchart of another example of a method for managing data traffic of software. The method may be performed by the portable electronic apparatus 100.

In step 302, the user control module 102 provides a user interface for a user to manage data traffic of a specific application. In the embodiment, the user interface further provides settings of traffic turn off time and application data traffic restart as user options.

In step 304, the user interface receives a user input. For example, in response to the time setting provided by the user interface, the user may enter a traffic turn off time to decide to turn off the data traffic of the selected application at the end of the traffic turn off time after the portable electronic apparatus 100 enters the standby mode. In response to the application data traffic restart setting provided by the user interface, the user may also select an application whose data traffic is to be restarted after the portable electronic apparatus 100 is woken up.

In step 306, the user control module 102 determines the user input to decide the traffic turn off time. The traffic turn off time may be user-defined as desired, e.g., 5 minutes. In some applications, the user interface may further provide suggested values of the traffic turn off time for the reference of the user. For example, these suggested values are determined according to an average value of bedtime of an average individual.

In step 308, the user control module 102 determines the user input to select at least one first application to be traffic managed from an application group. As the example in FIG. 2, the data traffic of the at least one selected first application is turned off when the portable electronic apparatus 100 is in a standby mode.

In step 310, the user control module 102 determines the user input to select at least one second application from the application group. When the portable electronic apparatus 100 is woken up, the data traffic of the at least one selected second application is determined to be restarted. In practice, the at least one selected second application is a part of all of the first application in step 206 in FIG. 2. For example, assuming that the user selects the first application such as instant messaging software applications "QQ", "Line" and "WhatsApp" whose data traffic is to be turned off after the portable electronic apparatus 100 enters the standby mode, from these selected instant messaging software applications, the user may also further select a second application whose data traffic is to be restarted after the portable electronic apparatus 100 is woken up, e.g., at least one of the instant messaging software applications "QQ", "Line" and "WhatsApp". It is to be understood that, the user is not mandated to select an application whose data traffic is to be restarted. At this point, for the user control module 102, the second application may be defined to a null value. The sequence for performing steps 308 to 310 is not limited to the sequence shown in FIG. 3. For example, steps 308 to 310 may be performed according to other sequences, or may be simultaneously performed.

In step 312, when the portable electronic apparatus 100 enters the standby mode for a period that exceeds the traffic turn off time, the communication control module 106 turns off the data flow of the selected first application. For example, assume that the user selects the first applications such as "QQ", "Line" and "WhatsApp", and the traffic turn off time is set to 3 minutes. After the portable electronic apparatus 100 enters the standby mode for over 3 minutes, the data traffic of these first applications is turned off.

In step 314, after the portable electronic apparatus 100 is woken up from the standby mode, the communication control module 106 restarts the data traffic of the selected second application. In continuation of the example in step 312, assume that the user selects the second application such as the instant messaging software "QQ". After the portable electronic apparatus 100 is woken up, the communication control module 106 restarts the data traffic of the instant messaging software "QQ" while keeping the traffic flow of "Line" and "WhatsApp" turned off.

Figure 4:
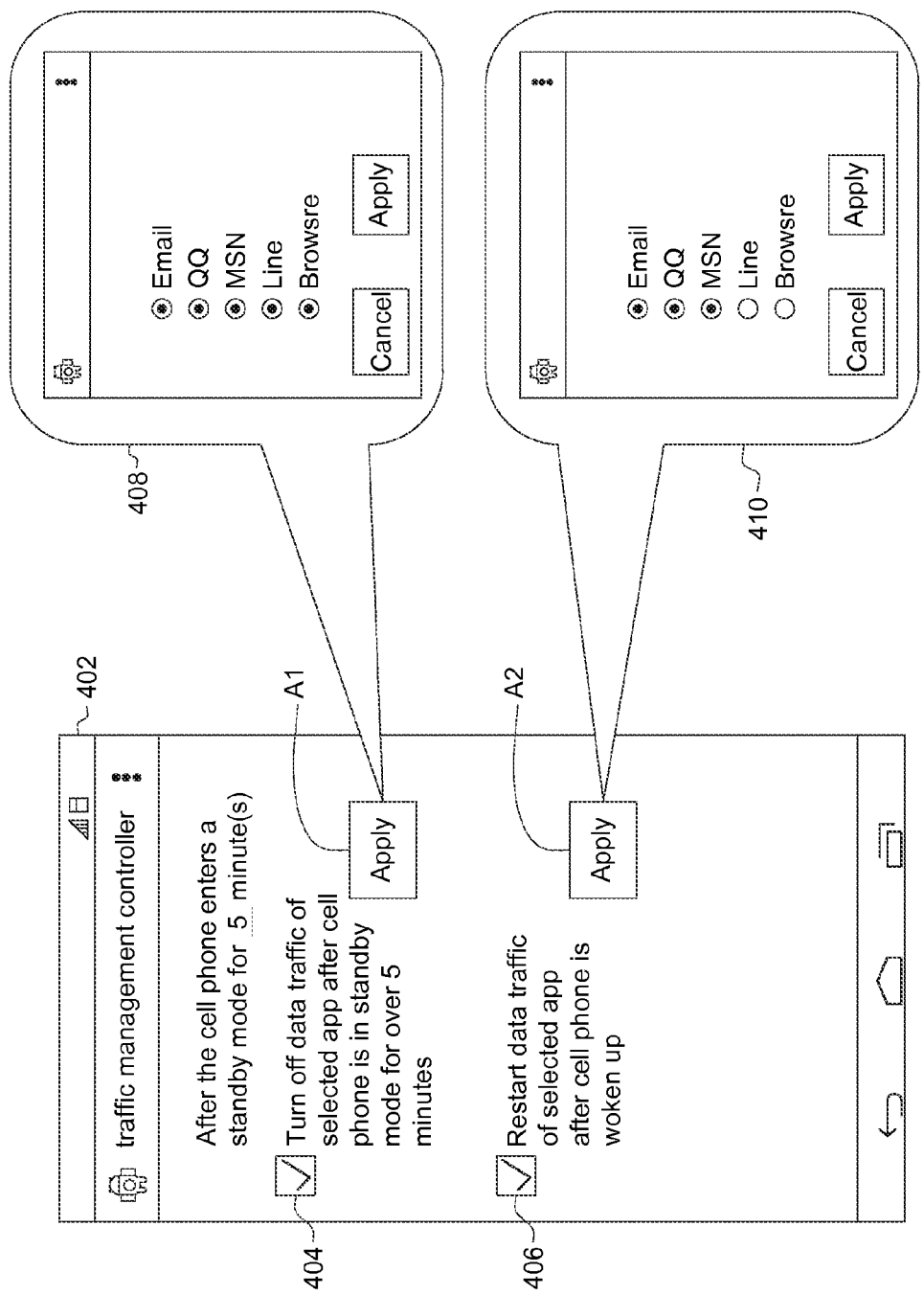
FIG. 4 is an example of a user interface for a user to manage traffic of applications.

FIG. 4 shows an example of a user interface for a user to manage data traffic of an application. It should be noted that, the example in FIG. 4 is for better understanding the present invention, and indicative texts, patterns, options and overall configuration depicted in the diagram are not to be construed as limitations to the present invention. An interface 402 is a user interface displayed after turning on a traffic management controller app. The interface 402 may include two sets of options 404 and 406. The option 404 represents that, after the portable electronic apparatus 100 (a cell phone in this example) enters a standby mode for a predetermined period (e.g., 5 minutes as shown), the data traffic of the selected apps is turned off. When the user checks the option 404 and click selects "apply" an option A1, the traffic management controller app enters an interface 408 for the user to select applications to be traffic managed in the standby mode. In this example, the application group includes multiple apps, e.g., "EMmail", "QQ", "MSN", "Line" and "Browser", which are all selected.

The optional 406 represents that, when the portable electronic apparatus 100 is woken up, the data traffic of the selected apps is restarted. When the user checks the option 406 and click selects "apply" of an option A2, the traffic management controller app enters the interface 410, so as to allow the user to select which applications whose data traffic is to be restarted when the portable electronic apparatus 100 is woken up. In this example, only three apps "Email", "QQ" and "MSN" are selected. Thus, when the portable electronic apparatus 100 is woken up, only the data traffic of these three apps "Email", "QQ" and "MSN" from the application group is turned on, while the data traffic of the other two apps "Line" and "Browser" remains turned off.

In the example in FIG. 4, by transmitting program parameters among the modules of the portable electronic apparatus 100, the traffic management task may be set via the user interface and be added to the parameter database 108. The process begins when the "apply" button is selected. As the portable electronic apparatus 100 enters the standby mode, the software obtains a standby parameter "suspend" of the portable electronic apparatus 100 via the power management module 104. The process then determines whether an overtime setting in the portable electronic apparatus 100 is within a traffic turn off time (e.g., 5 minutes), and obtains a program parameter value of the selected application.

In an example using Android development tools Eclipse, ADT and Android SDK as well as program development languages XML and Java, a function "getSystemService (getApplicationContext( ))" of "ConnectivityManager" may be utilized to obtain the program parameter of the currently operating app. For example, the tasks of the function "getSystemService(getApplicationContext( ))" may be controlled and managed by an application interface database of the communication control module 106.

If the process determines that the system is still within the traffic turn off time, the process enables an on/off status signal of the GPRS function, and sets a value "MobileDataEnabled( )" of the selected app to "true" to keep the selected app to continue to operate. In one example, a parameter "Context.CONNECTIVITY_SERVICE" of a function "android.net.ConnectivityManager" may be utilized to provide the GPRS connection status.

If the process determines that the system exceeds the traffic turn off time, the process disables the on/off status of the GPRS function, and sets a value "MobileDataEnabled( )" of the selected app to "false" to turn off the traffic of the selected app. When the portable electronic apparatus 100 is later woken up, the power management module 104 returns a parameter "resume", such that the process restarts the data traffic of the corresponding app according to the parameter stored in the parameter database 108.

In the above example, key permission may be added based on the development language XML, e.g., permission for enquiring a network status and for modifying a cell phone network connection status. For example, the permission for enquiring the network status may be represented by a code: <uses-permission Android:name="android.permission.ACCESS_NETWORK_STATE"/>. For example, the permission for cell phone network connection status may be represented by the following code: <uses-permission android:name="android.permission.MODIFY_PHONE_STATE"/>.

It should be noted that, the above software implementation is not for limiting the present invention. Given that a user is allowed to select a specific application whose data traffic is to be turned via an associated operation interface, variations of the above example are to be encompassed within the scope of the present invention.

Figure 5A:
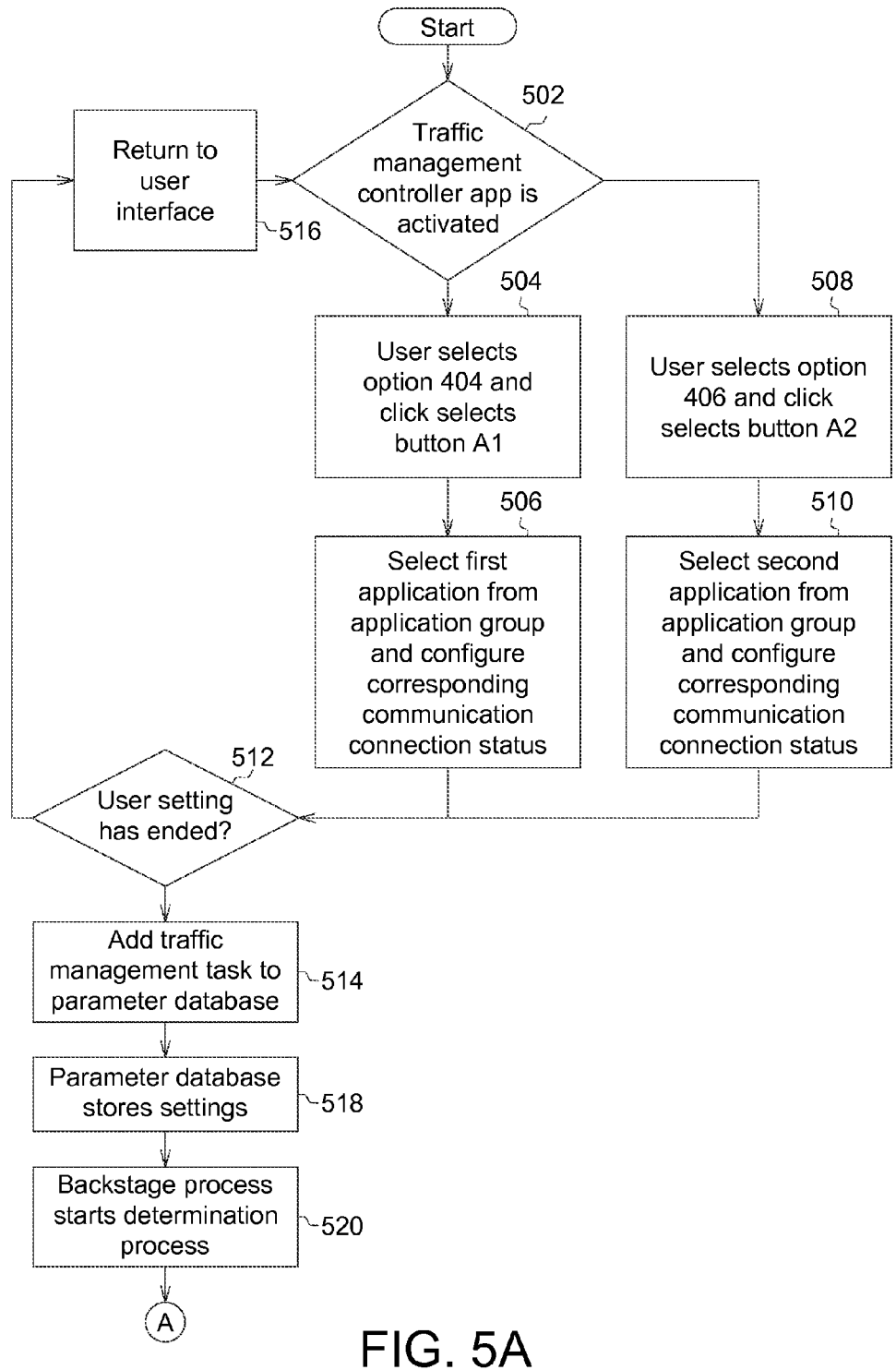
FIG. 5A to FIG. 5C are a flowchart of an example of system operations and communication among modules when a portable electronic apparatus displays the user interface in FIG. 4.
Figure 5B:
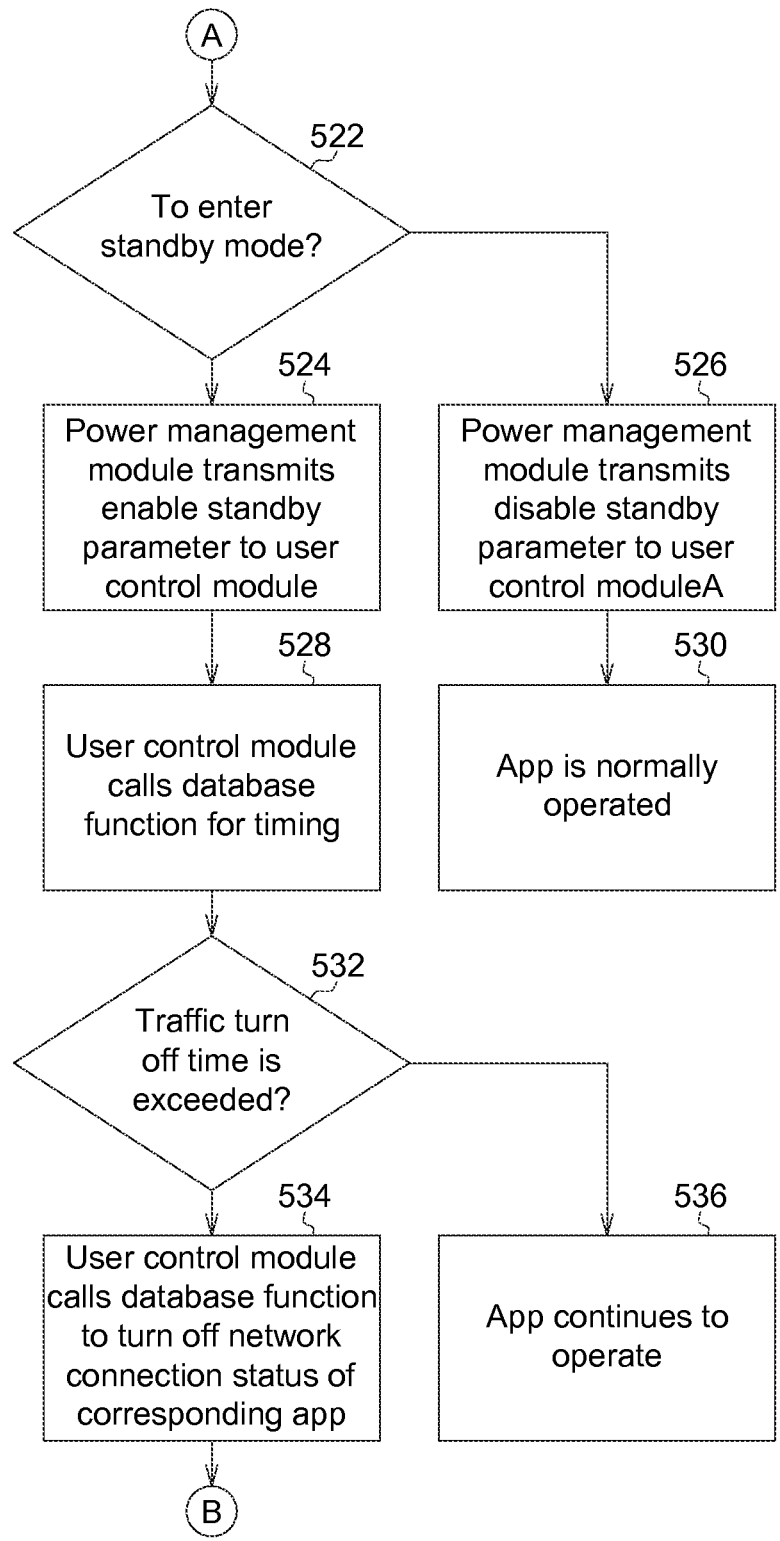
Figure 5C:
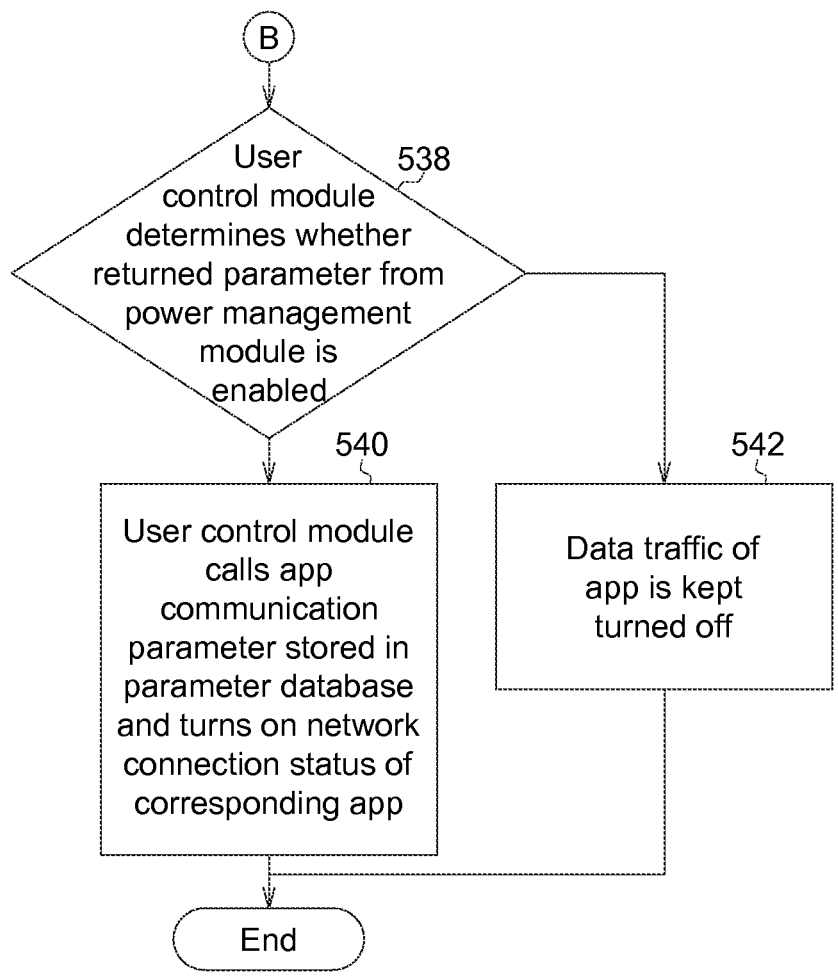

FIG. 5A to FIG. 5C show a flowchart of an example of system operations and communication among the modules when the portable electronic apparatus 100 displays the user interface in FIG. 4. In step 502, the traffic management control app is activated. In step 504, the user selects the option 404, and click selects the button A1 to enter step 506. In step 506, a first application is selected from the application group, and a corresponding communication connection status is configured. In step 508, the user selects the option 406, and click selects the button A2. In step 510, a second application is selected from the application group, and a corresponding communication connection status is configured. In step 512, it is determined whether the user setting has ended. If so, step 514 is performed to add a traffic management task to the parameter database 108; if not, it means the setting has not ended, and step 516 is performed to return to the user interface. In step 518, the parameter database 108 stores the setting for subsequent operations. In step 520, a backstage process begins a determination process, e.g., to determine whether the above task condition is satisfied. In step 522, it is determined whether the portable electronic apparatus 100 has been entered a standby mode. If so, the process proceeds to step 524, in which the power management module 104 transmits an enable standby parameter to the user control module 102 to prompt the portable electronic apparatus 100 to be in the standby mode. Next, in step 528, the user control module 102 calls a data function for timing. When a determination result of step 522 is negative, step 526 is performed. In step 526, the power management module 104 transmits a disable standby parameter to prompt the portable electronic apparatus 100 to be in a normal operating mode. In step 530, the app is normally operated. In step 532, the process determines whether the traffic turn off time is exceeded. If so, the process performs step 534, in which the user control module 102 calls a database function to turn off the network connection status of the corresponding app. If not, the process continues to step 536, in which the app continues to operate. In step 538, the user control module 102 determines whether a returned parameter from the power management module 104 is enabled. If so, it means that the portable electronic apparatus 100 is woken up, and then step 540 is performed. In step 540, the user control module 102 calls an app communication parameter stored in the parameter database 108, and activates the network connection status of the corresponding app according to the database function. If the returned parameter from the power management module 104 is not enable, it means that the portable electronic apparatus 100 is still in the standby mode, and the data traffic of the app is kept turned off, as shown in step 542.

In conclusion, the method for managing data traffic of software and the portable electronic apparatus using the method allow a user to turn off the data traffic of a selected application in a standby mode, thereby eliminating unnecessary waste of data traffic.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for managing data traffic of software, adapted for a portable electronic apparatus, comprising:
   providing a user interface through the portable electronic apparatus;
   receiving a user input via the user interface;
   providing a time setting via the user interface;
   determining the user input to decide a traffic turn off time;
   determining the user input to select at least one first application to be traffic managed from an application group;
   determining the user input to select at least one second application to be traffic managed from the application group;
   turning off the data traffic of the at least one first application when the portable electronic apparatus enters a standby mode for a period that exceeds the traffic turn off time; and
   after the portable electronic apparatus is woken up, restarting the data traffic of the at least one second application.

2. The method according to claim 1, wherein the at least one second application is a part or all of the at least one first application.

3. The method according to claim 1, wherein the step of turning off the data traffic of the at least one first application further comprises:
   controlling a communication control module of the portable electronic apparatus to turn off mobile data services corresponding to the at least one first application when the traffic turn off time ends.

4. The method according to claim 3, wherein the step of restarting the data traffic of the at least one second application further comprises:
   controlling the communication control module of the portable electronic apparatus to restart the mobile data services corresponding to the at least one second application when the portable electronic apparatus is woken up.

5. The method according to claim 1, wherein the application group comprises a plurality of communication applications, which are capable of operating in a background of the portable electronic apparatus and generating corresponding data traffic.

6. A portable electronic apparatus, comprising:
   a user control module, configured to provide a user interface to receive a user input, and to determine the user input to select at least one first application to be traffic managed from an application group and to select at least one second application from the application group;
   a power management module, configured to render the portable electronic apparatus to operate in a standby mode or a normal mode; and
   a communication control module, configured to turn off data traffic of the at least one first application after the portable electronic apparatus enters the standby mode;
   wherein the user interface provides a time setting, and the user control module determines the user input to decide a traffic turn off time corresponding to the time setting; when portable electronic apparatus enters the standby mode for a period that exceeds the traffic turn off time, the communication module turns off the data traffic of the at least one first application; when the portable electronic apparatus is woken up from the standby mode to the normal mode, the communication control module restarts the data traffic of the at least one second application.

7. The portable electronic apparatus according to claim 6, further comprising:
   a parameter database, configured to store a plurality of program parameters corresponding to the application group;
   wherein, the user control module, the power management module and the communication control module communicate with one another through the program parameters.

8. The portable electronic apparatus according to claim 6, wherein the at least one second application is a part or all of the at least one first application.

9. The portable electronic apparatus according to claim 6, wherein the communication control module turns off mobile data services corresponding to the at least one first application when the traffic turn off time ends.

10. The portable electronic apparatus according to claim 9, wherein the communication control module restarts the mobile data services corresponding to the at least one second application when the portable electronic apparatus is woken up.

11. The portable electronic apparatus according to claim 6, wherein the application group comprises a plurality of communication applications, which are capable of operating in a background of the portable electronic apparatus and generating corresponding data traffic.

* * * * *